Patented Aug. 11, 1942

2,292,644

UNITED STATES PATENT OFFICE 2,292,644

SILICEOUS MAGNESIA REFRACTORY MANUFACTURE

Harley C. Lee, Columbus, Ohio, assignor to Basic Refractories, Incorporated, a corporation of Ohio No Drawing. Application January 15, 1938, Serial No. 185,190

4 Claims. (Cl. 106—58)

This invention is concerned with refractories, and more particularly basic refractories composed of lime, silica and magnesia, proportioned such as to form periclase with bonding materials also of refractory character. In my Patent No. 2,089,970, there is disclosed the preparation of refractories containing periclase and merwinite materials providing lime and silica in weight ratio of around 1.4 to 1.0, together with such excess of magnesia as desired for periclase. If a merwinite periclase product as produced by suitable proportioning and firing, be suitably changed, more or less of the merwinite may be converted into calcium orthosilicate with facility, even more advantageously than calcium orthosilicate can be produced under some conditions in the first instance. While periclase in a refractory determines high refractoriness in the product and resistance to iron-rich slags, calcium orthosilicate primarily imparts strength at high temperature, and in the present invention the amount of periclase can be adjusted to meet desired service conditions, with particular advantage, while having the further utilities of merwinite and calcium orthosilicate. In compositions involving 20 per cent or more of magnesia, with a weight ratio of lime to silica within the limits 1.4–1.0 to 1.8–1.0, calcium orthosilicate in addition to merwinite can occure along with periclase. Where the ratio of lime to silica is around 1.4 to 1.0, the silicate formed however will be predominantly merwinite, and with a lime to silica ratio of about 1.6–1.0 to about 1.8–1.0 calcium orthosilicate will in general predominate over the merwinite. The properties of calcium orthosilicate and the other constituents of high refractory material are considerably affected by their paragenetic relationships, and there is interaction between the constituents modifying the characteristics of the product in a manner different from and much more effective than a mere addition of the properties of the constituents. Where merwinite, periclase and calcium orthosilicate are formed syngenetically, the calcium orthosilicate apparently forms solid solutions, the amount and character thereof being a function of the heat treatment and the associate minerals, and the syngenetic formation of merwinite and calcium orthosilicate provides improved stability and advantageous high melting characteristics to the finished product. By the expression "calcium orthosilicate" then, I include such solid solutions of calcium orthosilicate as may be formed with the associated minerals in my process. Merwinite in moderate quantities in such a composition modifies the crystal growth of the calcium orthosilicate and periclase, thereby improving the general refractory characteristics of the product, and by having merwinite present in the stage prior to final firing, the fashioning of the refractory material into desired shapes is facilitated by reason of the hydraulic setting characteristics. By changing a periclase merwinite composition over to the formation of calcium orthosilicate in suitable amount, the product can stand up under load at temperatures relatively high, much in excess of 1600° C., and as the calcium orthosilicate proportion is increased in the refractory, its ability to withstand loads at progressively higher temperatures is advanced. For maximum resistance under load at high temperatures, as for instance above 1600° C., the calcium orthosilicate would desirably predominate over the merwinite.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

To burn lime-magnesia-silica mixtures to produce a product composed essentially of merwinite, calcium orthosilicate and periclase, very high firing temperatures are necessary where the calcium orthosilicate is to predominate. It is of great advantage then to be able to attain a high calcium orthosilicate content without the handicap of excessively high manufacturing temperatures, and the present process in this aspect affords a very advantageous procedure.

In the preparation of refractories contemplated, the raw materials including magnesia, lime and silica, are proportioned to provide the desired amount of periclase, and the lime and silica in a ratio below 1.87 (the ratio which would be effective in bringing about the development essentially of calcium orthosilicate). However, the lime and silica should not be in ratio much below 1.4 in order to insure formation of substantial amounts of merwinite and in order to limit the formation of silicates of lower melting temperature, as for instance monticellite. In proportioning the raw materials for such initial burning or clinkering, the precise ratios depend somewhat upon the magnesia content desired. A relatively large proportion of ingredients such as merwinite, facilitates productions of clinker at temperatures which are commercially feasible, but it is important to keep the lime-silica ratio in the raw materials as high as possible consistent with reasonably easy firing of the clinker into a dense well-shrunk product suitable for further working into shapes. The presence of material of low refractoriness such as monticellite in the center of the clinkered particles would lower the ability of the finished refractory to support loads at high temperature. With periclase contents of 40 per cent or less, it is generally desirable to keep the lime-silica ratio above 1 50. Mixtures having a lime-silica ratio of about 1.50/1.0 to about 1.70/1.0 can be commercially fired to a dense hard clinker. With magnesia contents of about 40 to about 60 per cent, the preferable lime-silica ratio to permit of practical firing should be from about 1.4/1.0 to about 1.65/1.0. With magnesia contents of from about 60 per cent to about 80 per cent, the lime-silica ratio would preferably fall within the range of about 1.4/1.0 to about 1.60/1.0. With magnesia contents of about 80 per cent or more, the lime-silica ratio should preferably be in the range of from about 1.35/1.0 to about 1.50/1.0. Where the product contains a small percentage of iron oxide, alumina or other accessory fluxes, slightly higher ratios of lime and silica may be conveniently employed. Even though burning at relatively low temperatures would be possible by use of such accessory fluxes, one of the purposes of the present invention is to make possible the production of a refractory without their use. In general, the ratios of lime to silica which can be most advantageously fired and later allow change over to calcium orthosilicate by an increment of lime, will range from about 1.30 where the magnesia content is over 90 per cent to about 1.75 where the magnesia content is around 20 per cent. In all of the above ranges, the magnesia contents and lime-silica ratios refer to the clinkered product.

In selecting raw materials to furnish the required magnesia, lime and silica, quite a variety of natural materials can be employed, and the choice will depend somewhat upon the precise proportions of silicate and periclase desired in the final product. For lime and magnesia, magnesite, brucite, limestone, magnesian limestone, and dolomite supply the principal source. Suitable sources of silica may be found in quartz, tripoli, magnesium silicates, such as serpentine, dunite, sepiolite, saponite, talc, magnesia containing bentonites of low alumina content, magnesian clays, and so-called sedimentary magnesites. By suitable combining, it is possible to use materials such as silicious magnesites, brucites and dolomites that are not otherwise applicable for production of refractories. Raw materials should preferably be relatively free from or contain only small percentages of iron oxide and alumina. In general it is desirable that iron oxide does not exceed about five per cent and alumina does not exceed about three per cent. Silica may advantageously be introduced in the form of silicates which inherently have their silica in a finely divided or hydrated condition, as such silica on heating reacts readily with lime and tends to produce a much more uniform, mature and stable product. Silicates carrying magnesia are useful as augmenting the magnesia content. Where the lime-silica ratio for the clinker product is to be around 1.4/1.0 to 1.50/1.0, silica in such form as quartz or silica sand or tripoli, may be employed, in part or in whole, even though such forms of silica are not as reactive as the hydrated silicates afore-mentioned. It is possible to select raw materials where this calcium orthosilicate will remain in the high temperature form in the resulting clinkers. This is generally the case where raw materials include the so-called sedimentary magnesites. Magnesium clays, talcs, and serpentines from some sources also produce clinkers which contain calcium orthosilicate in the stable, high temperature form. In general, rather than find by trial and error which raw materials produce stable calcium orthosilicate, it is simpler and sometimes more economical to add fractional percentages of borates, phosphates, or a small percentage of chromium oxide to the raw materials. These materials not only effect stabilization of the calcium orthosilicate, but exert a pronounced mineralizing effect in the clinkering operation. In small quantities, this mineralizing effect is helpful in promoting chemical combination and maturity in the product. In larger amounts these materials impair the refractoriness of the product and are to be avoided. Somewhat larger amounts of chromium oxide are required to effect stabilization. Where the periclase content of the refractory is above about 50 per cent, chromium oxide can be advantageously used without impairing the refractoriness of the product. In general, and particularly in the case of lower contents of periclase, it is more advantageous to use borates and phosphates or mixtures thereof. These mineralizing or stabilizing agents may be added in the form of borates such as colemanite, ulexite, rasorite, borax, dehydrated borax, or boric acid; or phosphates such as calcium phosphate, rock phosphate, sodium phosphate, phosphoric acid; and suitable sources of chromium are chromium oxide or chromite. The batch materials should be suitably ground, and where silica in the form of quartz or the like is employed it is important that the material be ground to all pass 200 mesh.

The raw materials are suitably pulverized and intimately mixed or ground to a slurry, and the mixture may be fed into a rotary kiln and fired at a temperature of about 2800 to 3300° F., the temperature depending in general upon the ratio of the lime-silica in the mixture, higher temperatures being required as the ratio of lime to silica increases. The burning operation is continued at such a temperature and for such a time as to produce a hard, dense and well-shrunk clinker that can be further formed into refractory shapes. As the time of heating is increased, the temperature of burning can be correspondingly decreased. Substances such as iron oxide and alumina, if present in the mixture, somewhat lower the firing temperature required. Instead of firing in a rotary kiln, the raw material mixture may be formed into briquettes and these may be fired in periodic, shaft or tunnel kilns at suitable temperatures which in general are lower than those required in rotary kilns.

Having produced a fired product or clinker containing merwinite, I now further treat this to the production of a high calcium orthosilicate content by changing merwinite thereto through raising the lime content. As seen, the ratio of lime to silica for calcium orthosilicate is higher than that which has been provided in the merwinite clinker, and I now add lime in amount as determined by molecular proportions to convert the merwinite as desired to calcium orthosilicate, controlled quantities of lime or suitable calcareous material being incorporated. I prefer to maintain the ratio of lime to silica below 1.87 in order to insure that essentially all of the lime added will combine with the silicates or merwinite to formation of calcium orthosilicate. Microscopic evidence shows that some silicate or merwinite is so deep in the refractory grains of the clinker that it is impracticable for the lime additions to react with the merwinite under available processing conditions. Accordingly by maintaining the lime-silica ratio below the molecular ratio of 1.87 I may prevent uncombined lime or unstable tricalcium silicate and fusible calcium aluminates or ferrites in the finished product. The use of slightly less lime than is necessary for the transformation of all silicates present into calcium orthosilicate improves the refractory characteristics of the product.

The failure of basic refractories under load at high temperature generally occurs because of softening of the bond which holds together the refractory particles. In the present process however, the development of calcium orthosilicate and periclase from some of the merwinite by an increment of lime during a second burning causes the particles to be bonded together effectively by an intercrystalline bond. This bond is microcrystalline in character and persists over wide temperature ranges, and it is highly refractory, in fact generally more so than the refractory particles or grog and it thereby materially improves the load resistance of the ultimate refractory. Its microcrystalline character also contributes largely to the spalling resistance of the final refractory body.

In most cases, I add lime sufficient to bring up the lime-silica ratio to approximately 1.85/1.0, although favorable results may be obtained with ratios considerably less. Where large amounts of periclase are present and the lime-silica ratio of the clinker is around 1.4 to 1.0 or slightly less to facilitate burning, it is not always necessary to add all of the lime that would be required to approximate a ratio of 1.85. Additions of more than about 8 per cent CaO are prone to result in uncombined lime, tricalcium silicate and fusible aluminates or ferrites. Generally, it is preferable to hold the lime additions under about 6 per cent. The lime is most effectively introduced in the form of hydrated lime or hydrated dolomitic lime, such forms having greater reactivity, as well as being more easily introduced through the mass of grog particles. Hydrated lime also improves the workability of the material which is to be formed into shapes. Instead of hydrated lime, finely ground limestone or dolomite, or a high calcium clinker suitably ground, as for instance a clinker composed largely of tricalcium silicate, may be used as lime material. Such latter source of lime involves addition of rather undesirably large amounts, but tends to obviate the possibility of having uncombined lime in the finished product. Such lime material can be used most advantageously when the lime addition is to be less than about 4 per cent. The well-shrunk clinkered material having been suitably comminuted, as for instance to pass a 6 or 8 mesh screen with a relatively large amount of fine material, the lime as stated, is admixed. It is convenient also to introduce small quantities of borates or phosphates or mixtures thereof, to stabilize against inversion of the new calcium orthosilicate which will be produced in the final burning operation. These materials should in general not exceed about 0.5 per cent of the total.

As illustrating lime-silica ratios and lime additions which have been found practicable, the table below will be seen to show some convenient proportions, although these are not the only ranges which I have found workable. It is again to be noted that the presence of extraneous materials, such as iron oxide, alumina, boron, alkalies, etc., tends to reduce the temperatures at which the original clinker can be formed and thereby increases the lime-silica ratio that may be employed in the clinker. The ratios thus indicated are most applicable to burned mixtures of materials which were of considerable purity.

| MgO in clinker, approximate per cent | Lime-silica ratio in the clinker | Augmented lime-silica ratio in final refractory | Change in ratio by augmentation | CaO added, per cent |
|---|---|---|---|---|
| 30 | 1.50/1.0 to 1.70/1.0 | 1.65/1.0 to 1.85/1.0 | 0.1/1.0 to 0.25/1.0 | 2 to 8 |
| 40 | 1.50/1.0 to 1.65/1.0 | 1.65/1.0 to 1.85/1.0 | 0.1/1.0 to 0.25/1.0 | 2 to 8 |
| 50 | 1.45/1.0 to 1.60/1.0 | 1.60/1.0 to 1.85/1.0 | 0.1/1.0 to 0.25/1.0 | 2 to 6 |
| 60 | 1.40/1.0 to 1.55/1.0 | 1.60/1.0 to 1.85/1.0 | 0.1/1.0 to 0.3/1.0 | 2 to 6 |
| 70 | 1.40/1.0 to 1.50/1.0 | 1.55/1.0 to 1.85/1.0 | 0.1/1.0 to 0.35/1.0 | 1 to 5 |
| 80 | 1.35/1.0 to 1.50/1.0 | 1.50/1.0 to 1.80/1.0 | 0.1/1.0 to 0.4/1.0 | 1 to 4 |
| 90 | 1.30/1.0 to 1.45/1.0 | 1.50/1.0 to 1.80/1.0 | 0.2/1.0 to 0.4/1.0 | 1 to 2 |

When the admixed lime and stabilizer have been intimately incorporated with the pulverized clinker, water is added, and the material is formed into desired shapes, as by customary pressing. The shapes are burned in kilns, periodic or tunnel, at temperatures of at least 2600° F. In general, when the lime-silica ratio approximates 1.85, more heat treatment is necessary than when this final ratio is somewhat lower.

Alternatively, for certain special uses, the material may be formed into shapes at somewhat higher pressures after it has been bonded with a suitable cement. These shapes are cured, and may be set directly in position of service, where the heat of the furnace or kiln may complete their maturity while they are in use.

As an example: With 265 parts of dolomite by weight, and 100 parts of talc by weight (analyzing approximately: $SiO_2$, 56.0; $R_2O_3$, 1.0; CaO, 6.2; MgO, 30.7) I incorporate one part of rock phosphate and one part of boric acid. The raw materials are proportioned to give a lime-silica ratio of about 1.55/1.0. These materials are ground together with water as a slurry to a fineness of approximately 85 per cent passing 200 mesh, and the slurry is fed into a rotary kiln and fired with oil at a temperature of around 3200° F. to form a firm, compact clinker. The resulting clinker consists of hard, greyish-white particles comprising periclase intimately mixed with merwinite and calcium orthosilicate. The clinker analyzes approximately: $SiO_2$, 24.3; $R_2O_3$, 1.2; CaO, 37.5; MgO, 37.0. This clinker is then pulverized to pass approximately a 10 mesh screen so that 30 to 40 per cent of the total will pass a 100 mesh screen. I then add to each 100 parts of the pulverized clinker about 5 parts of CaO to give a lime-silica ratio in the finished brick of about 1.75/1.0, the CaO being added as 10 parts of hydrated dolomitic lime, and with this I add ¼ part each of finely ground calcium phosphate and boric acid. I mix the pulverized clinker, lime, and above mineralizers thoroughly in a dry condition and then incorporate a small percentage of water with the mass and press the dampened material into bricks. These are fired at cone 20 to the formation of strong, well-shaped brick.

As another example: With 100 parts of finely ground talc and 175 parts of ground, hydrated dolomitic lime, proportioned to give about 1.6 parts of lime to each part of silica, I incorporate one part of finely ground dehydrated razorite and intimately mix these materials, first dry; then grind them wet with water to form a slurry. This slurry is then fired in a rotary kiln at around 3200° F. The material requires fairly long processing at this temperature to mature it into a strong, compact clinker. The resulting clinker analyzes: $SiO_2$, 23.7; $R_2O_3$, 1.1; CaO, 38.1; MgO, 37.0. Microscopically, the clinker has a poikilitic structure, wherein small crystals of periclase are enclosed in elongated larger crystals of calcium orthosilicate and merwinite. I crush this clinker to pass about an 8 mesh screen and grind a portion to obtain approximately 50 per cent of material which will pass about 65 mesh. I incorporate with each 100 parts of this clinker in the dry state, 6 parts of hydrated high calcium lime, ¼ part of calcium phosphate, and ¼ part of boric acid, to give a lime-silica ratio in the finished brick of about 1.8/1.0. I add water to this intimate mixture, press the material into shapes, dry, and fire these in a kiln to about cone 20 (about 1520° C.). In the resulting brick, the fine-ground fraction of the clinker and the outer portion of the coarser particles have reacted with the added lime to form a micro-crystalline bond of calcium orthosilicate and periclase. The resulting refractory is characterized by its ability to carry loads at high temperatures in distinction to the more expensive magnesia refractories, which are notably wanting in this respect.

As another example: To 200 parts of finely ground, low-grade magnesite (as from southern Nevada), analyzing: $SiO_2$, 11.4; $R_2O_3$, 1.4; CaO, 6.3, MgO, 39.0, I add 85 parts of finely ground dolomite. The resultant mix has a lime-silica ratio of about 1.68. I then intimately mix these materials dry, add water, and pug them into a stiff mud, forming small dobies. These are then charged into a basic lined shaft kiln and fired to a very high temperature using admixed coke and a forced draft. Coke containing about 5.5 per cent ash is used. Dense, hard, dobies are formed which now have a lime-silica ratio of approximately 1.55 and analyze about: $SiO_2$, 15.4; $R_2O_3$, 2.4; CaO, 23.8; MgO, 58.3. I then crush these lumps to pass approximately a 10 mesh screen, grinding a portion so that approximately 40 per cent of the total will pass a 100 mesh screen. To each 100 parts of the above dry clinker I add approximately 3.0 parts of CaO in the form of a finely ground dry hydrated dolomitic lime, it requiring approximately 6 parts of such hydrate, and I add with the lime ¼ part of finely ground calcium phosphate and ¼ part of boric acid. The clinker, lime, and mineralizer are first thoroughly mixed dry, then further mixed with ground 8 per cent of water and the mix is pressed at pressures of approximately 10,000 lbs. per sq. in. into shapes. The bricks, after drying, are fired in a periodic kiln to about cone 18. The resulting brick now have a lime-silica ratio of about 1.75 to 1.0 and analyze approximately: $SiO_2$, 14.6; $R_2O_3$, 2.5; CaO, 25.6; MgO, 57.2. Whereas, the original magnesite in this instance was of non-refractory character, by the process described a brick of remarkable refractoriness and load-bearing property is produced.

As another example: To 200 parts of dolomite, and 100 parts of serpentine (analyzing: silica, 37.6; iron oxide, 7.8; alumina, 2.2; lime, 0.2; and MgO, 35.6), maintaining about 1.6 parts of lime to each part of silica in the product, one part of colemanite is added, and the mixture is finely ground to a slurry which is passed through a rotary kiln at a temperature somewhat in excess of 3000° F. The resulting clinker is hard and dense, slightly brownish in color, and analyzes approximately: $SiO_2$, 20.4; $Fe_2O_3$, 4.3; $Al_2O_3$, 1.1; CaO, 32.6; and MgO, 41.6. This clinker is crushed to about 6 mesh to contain about 40 per cent of very fine material. To each 100 parts of this is added 8 parts of hydrated dolomitic lime and ½ part of finely ground rock phosphate. These materials are thoroughly mixed dry, then tempered with water and formed into shapes. These shapes are then fired to approximately cone 18 in a periodic kiln. The resulting brick now have a lime-silica ratio of around 1.8/1.0, and analyze: $SiO_2$, 19.10; $Fe_2O_3$, 4.02; $R_2O_3$, 1.21; CaO, 34.27; MgO, 41.38. Brick of this character are particularly adaptable for such uses as open hearth furnace walls, bulkheads, and ports.

As another example: With 100 parts of dolomite there are incorporated 20 parts of fine silica sand, and one part of dehydrated rasorite, the silica being proportioned with the dolomite to give a ratio of about 1.5 of lime to 1.0 of silica. The mixture is finely ground as a slurry, care being taken that the hard silica sand is ground to approximately 200 mesh size in the presence of the soft dolomite. The mixture is fired in a rotary kiln to a temperature somewhat in excess of 3000° F. The rasorite serves as a mineralizer. The resulting clinker analyzes: $SiO_2$, 27.8; $R_2O_3$, 1.2; CaO, 41.8; MgO, 29.0. The clinker contains a large proportion of merwinite with accessory amounts of calcium orthosilicate and periclase. A novel refractory can be made from this product by crushing to about minus six mesh and producing material substantially passing a six mesh screen and containing about 50 per cent minus 100 mesh material. To each 100 parts of this refractory material is added about 8 per cent of hydrated, high calcium lime, and ½ part of finely divided calcium phosphate. The material is then mixed with considerable water and the whole pressed into brick at a high pressure. The resulting brick are hard and dense. These brick are cured in a moist condition a week or more, and the resulting brick are sufficiently strong to permit handling and setting green in low walls. Preferably, however, I refire the brick to cone 16. The resulting brick have a lime-silica ratio of about 1.70/1.0. Such brick possess a low thermal conductivity and are well suited for use in kilns for burning calcareous materials such as lime, dolomite, and Portland cement.

As another example: I take a hard, dense, dead-burned magnesite clinker which analyzes approximately: $SiO_2$, 3.6; $R_2O_3$, 1.4; CaO, 4.9; magnesia, 90.0. I pulverize this clinker to pass about 14 mesh producing some 40 per cent of material which will pass 100 mesh. To this I add about 3.0 per cent of fine-ground hydrated dolomitic lime and about 0.2 per cent of boric acid. I intimately disperse the lime and boric acid through the pulverized magnesite clinker, mix further with water, and press the mixture into bricks using high pressures. I first dry and then fire the resulting brick at about cone 18, 1520° C. producing thereby a brick possessing excellent resistance to spalling and with excellent ability to carry loads at high temperatures. The mixture can also be used to excellent advantage in the formation of a monolithic hearth in furnaces.

In the above examples $R_2O_3$ in the analyses includes such ingredients as $Fe_2O_3$, $Al_2O_3$, $P_2O_5$, and $B_2O_3$, except where such ingredients are mentioned separately.

Other modes of applying the principle of the invention may be employed, change being made as regards the details described, provided the features stated in any of the following claims, or the equivalent of such, be employed.

I therefore particularly point out and distinctly claim as my invention:

1. A process of making a refractory, which comprises changing a periclase-merwinite composition to convert at least a part of the merwinite to a substantial amount of calcium orthosilicate by admixing calcareous material raising the lime-silicate ratio above 1.5 to 1 but not substantially over 1.85 to 1 whereby on raising the temperature of the mixture to reaction range such conversion occurs.

2. A process of making a refractory, which comprises changing a periclase-merwinite-calcium orthosilicate composition to include greater amounts of calcium orthosilicate by admixing calcerous material raising the lime-silica ratio above 1.5 to 1 but not substantially over 1.85 to 1 whereby on raising the temperature to reaction range conversion of merwinite to calcium orthosilicate occurs.

3. A refractory comprising an unfired shape of periclase, merwinite, and lime in amount to change the merwinite at least in part to calcium orthosilicate whereby on raising the temperature to reaction range conversion of merwinite to calcium orthosolicate occurs.

4. A refractory comprising an unfired shape of periclase, merwinite, calcium orthosolicate, and sufficient lime to change the merwinite to substantially greater amounts of calcium orthosilicate whereby on raising the temperature to reaction range conversion of merwinite to calcium orthosilicate occurs.

HARLEY C. LEE.